US006760743B1

(12) United States Patent
Heddes et al.

(10) Patent No.: US 6,760,743 B1
(45) Date of Patent: Jul. 6, 2004

(54) INSTRUCTION MEMORY SYSTEM FOR MULTI-PROCESSOR ENVIRONMENT AND DISJOINT TASKS

(75) Inventors: Marco C. Heddes, Raleigh, NC (US); Mark Anthony Rinaldi, Durham, NC (US); Brian Alan Youngman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,757

(22) Filed: Jan. 4, 2000

(51) Int. Cl.[7] .................................................. G06F 9/00
(52) U.S. Cl. ....................... 709/100; 709/102; 709/201; 711/5; 711/129; 711/147; 711/148; 711/151; 711/153; 711/157; 711/202; 712/28
(58) Field of Search ................................. 709/100, 102, 709/201; 711/5, 147, 148, 153, 151, 157, 202, 129; 712/28

(56) References Cited

U.S. PATENT DOCUMENTS

| | | | | |
|---|---|---|---|---|
| 4,968,977 A | * | 11/1990 | Chinnaswamy et al. | ... 340/2.24 |
| 5,043,874 A | | 8/1991 | Gagliardo et al. | .......... 364/200 |
| 5,136,714 A | * | 8/1992 | Braudaway et al. | ........ 710/260 |
| 5,146,607 A | | 9/1992 | Sood et al. | .................. 395/800 |
| 5,274,789 A | | 12/1993 | Costa et al. | ................. 395/425 |
| 5,590,300 A | | 12/1996 | Lautzenheiser | ............. 395/412 |
| 5,675,790 A | | 10/1997 | Walls | .......................... 395/621 |
| 5,875,487 A | * | 2/1999 | Schwartz et al. | ........... 711/202 |
| 5,922,057 A | * | 7/1999 | Holt | ............................. 710/52 |
| 6,473,838 B1 | * | 10/2002 | Bass et al. | .................. 711/151 |
| 2001/0049770 A1 | * | 12/2001 | Cai et al. | ..................... 711/129 |

FOREIGN PATENT DOCUMENTS

| | | |
|---|---|---|
| EP | 0 798 925 A2 | 10/1997 |
| WO | WO 97/30399 | 8/1997 |

\* cited by examiner

*Primary Examiner*—Nabil El-Hady
(74) *Attorney, Agent, or Firm*—Driggs Lucas Brubaker & Hogg Co. L.P.A.

(57) ABSTRACT

An instruction memory system is shared by a plurality of processors and the system utilizes an increased bandwidth to support the combined number of processors. The total instruction address space is divided into code segments according to the disjoint tasks to be performed. The instruction codes of each processor are consolidated into one copy for control instructions and duplicate copies for other disjoint tasks such as inbound requests and outbound requests that have greater processor contention. Interleaving of the memory arrays for certain disjoint tasks serves to provide a larger number of instructions for these tasks. The system utilizes arbiters to receive all disjoint tasks and to control multiplexors that send addresses to memory arrays.

22 Claims, 1 Drawing Sheet

INSTRUCTION MEMORY SYSTEM FOR MULTI-PROCESSOR ENVIRONMENT AND DISJOINT TASKS

BACKGROUND OF THE INVENTION

1. Field of the Invention

This invention relates to the field of computer memory, with particular attention to that portion of a computer memory system that receives and delivers instructions for multiple processors.

2. Description of Related Art

Embedded processors provide a flexible means for implementing complex functions in computer hardware. The demands of high speed networking systems often require several processors running concurrently to maintain network throughput and low latency. These processors provide a pooled resource with each processor working on separate data frames, cells, or messages. This activity may be further subdivided into disjoint procedures such as inbound traffic, outbound traffic, and control traffic processing. Since the proportion of each of these traffic types can vary dynamically, each of the processors would ideally be able to perform the tasks of all traffic types. In a classic implementation of such a multiprocessor resource, each processor would have its own memory to store instructions. While this approach is acceptable for systems implemented with a couple of processors, it becomes quite expensive for systems with a large number of processors.

As an alternative approach, all of the instructions from all processors in a system can be consolidated into one memory array which is shared with all of the processors. This results in a savings in memory redundancy, but with increased latency, requiring some processors to be queued to wait their turn for receipt of data, particularly during periods of peak contention.

BRIEF DESCRIPTION OF THE INVENTION

It is an object of the present invention to satisfy the instruction requests of a plurality of processors in an optimum manner.

Another object of the present invention is to reduce the amount of instruction storage by consolidating instructions in more than one memory array, in an arrangement that will facilitate retrieval of memory segments in a rapid and efficient manner.

Yet another object is to increase instruction bandwidth to simultaneously and rapidly allow the performance of a plurality of disjoint tasks.

Still another object of the invention is to eliminate the need to store instructions in the memory of each processor.

These and other objects will become self evident in light of the disclosure of the invention as herein described.

The present invention relates to a computer instruction memory system and method for handling instructions for multiple processors. The system comprises a plurality of memory arrays corresponding to a number of disjoint tasks to be performed. A separate data path and data address is provided for each memory array. Means are included for consolidating identical instruction codes for a given disjoint task into one or more memory arrays. Means are also employed to share all of the instruction codes from the memory arrays with all of the processors.

The disjoint tasks include inbound traffic and outbound traffic. Instructions for each of these tasks are stored in duplicate in multiple memory arrays. The disjoint tasks also include a code for control tasks, and this code is stored in a separate memory. All requests for control task instructions are received by the first arbiter which services these requests and controls a first multiplexor. The multiplexor passes the address of the serviced control instruction request to a single memory array. A second arbiter receives and services all requests for inbound task instructions and controls a second multiplexor and third multiplexor in order of priority. The second multiplexor passes the address of the first serviced inbound instruction request to the second memory array. Likewise, the third multiplexor passes the address of the second serviced inbound instruction request to the third memory array. A third arbiter receives and services all requests for outbound task instructions and controls a fourth multiplexor and fifth multiplexor in order of priority. The fourth multiplexor passes the address of the first serviced outbound instruction request to a fourth memory array and the fifth multiplexor passes the address of the second serviced outbound instruction request to a fifth memory array.

The system further includes an instruction address divided into code segments. These segments are implemented with separate arrays and arbitration. Each code segment corresponds to one of the disjoint tasks to be performed.

The system further includes interleaved memory arrays. These can be used, for example, for carrying out a reporting task. For this, the system uses a fourth arbiter and a fifth arbiter that are adapted to receive and service all requests for disjoint task instructions stored in the interleaved arrays. The fourth arbiter controls a sixth multiplexor and the fifth arbiter controls a seventh multiplexor on the order of priority. The sixth multiplexor passes the address of the serviced instructions from the fourth arbiter to a sixth memory array, and the seventh multiplexor passes the address of the serviced instructions from the fifth arbiter to a seventh memory array.

The invention further includes a computer instruction memory system having increased memory bandwidth and a method for increasing the memory bandwidth of a computer instruction memory system. This is achieved by segmenting the instruction address space into separate code segments. Each address space is implemented with separate memory arrays and arbitration. One disjoint task is assigned to each of the code segments. Certain of the instruction address segments having high processor contention are provided with two memory arrays with duplicate content. An arbiter then arbitrates service requests from the processors, to each memory array. Separate data address and data paths are provided for each memory for decreased latency.

DETAILED DESCRIPTION OF THE INVENTION

Figure 1:
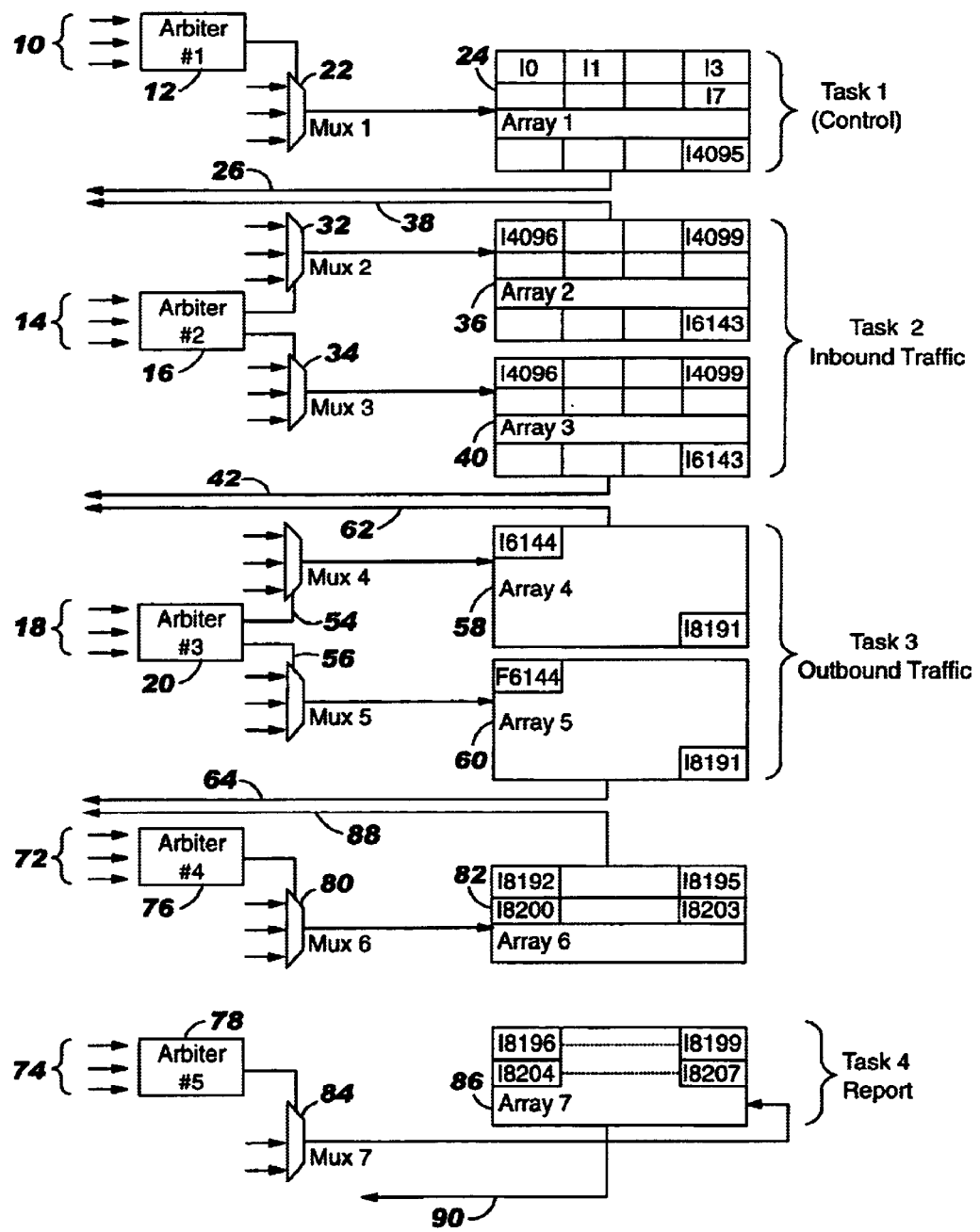
FIG. 1 is a diagram showing a configuration of 7 memory arrays configured according to the teachings of the present invention.

According to the teachings of the present invention, instructions for a plurality of processors are described as being stored in seven memories that operate as four independent subsystems. However, the invention is likewise useful with a greater or fewer number of subsystems and memories. Access to each of the subsystems is shared among all the processors and a conventional loader interface that provides means for loading the instructions into each memory subsystem. Each memory subsystem includes one or two arbiters for regulating access to the memory.

In a typical arrangement, a first memory subsystems is identified for task #1 instructions, and uses a single memory array containing 1024 memory locations. Each memory location contains two or more processor instructions to reduce processor contention for the memory. This first subsystem contains processor control instructions.

The second subsystem is identified for task #2 instructions and combines a pair of memory arrays for added instruction bandwidth. Each of these arrays contains 512 memory locations that are duplicates of one another. This second subsystem is used for the disjoint task of handling inbound traffic. As with the first memory array used for control instruction, each memory location contains two or more processor instructions.

The third subsystem is identified for task #3 instructions relating to outbound traffic, and in a manner similar to the second subsystem, combines a pair of duplicate memory arrays for added instruction bandwidth. Each of these arrays contains 512 memory locations. As with the first and second memory arrays, each memory location contains two or more processor instructions.

A fourth memory subsystem is identified for task #4 instructions, and is characterized by a pair of arbiters and first and second interleaved memory arrays. It is shown as being used for the processing of reporting instructions. The interleaving involves a repeating pattern of storing a first set of two or more processor instructions in the first memory array, the second set of processor instructions in the second array, the third set in the first array, etc.

Additional memory subsystem used for other disjoint tasks or to regulate access to instructions stored in an external DRAM may likewise be included.

Turning now to the drawing, FIG. 1 is a schematic showing the critical paths for the flow of instruction addresses from a plurality of processors (not shown) to the memory arrays and the return of instruction data to the processor serviced by the arbiter. In this embodiment, the system describes 4 separate tasks, defined as task #1 for control instructions; task #2 for inbound instructions, task #3 for outbound instructions and task #4 for reporting instructions.

Requests 10 for control tasks from multiple processors are received by a first arbiter 12. A processor request for the first arbiter is activated whenever a processor needs a new group of 4 control task instructions as indicated by the processor's program counter.

In like manner, multiple requests 14 for inbound tasks are received by a second arbiter 16 and multiple requests 18 for outbound tasks are received by third arbiter 20. The fist arbiter 12 prioritizes the controltasks and controls a multiplexor 22 to pass the address of the selected processor's request to the output of the multiplexor initiating the data request. Each data address is passed along to the memory array 24 which provides storage for instructions I 0 through I 4095. The relevant data is retrieved from storage and is transmitted on bus 26 to the relevant processor initiating the request. Because of the comparatively low level of processor contention for control tasks, one memory array can adequately handle the requests in a timely manner.

On the other hand, the inbound and outbound data requests are handled somewhat differently. The arbiter 16 for the inbound instruction requests services two requests on the basis of priority and controls a second multiplexor 32, and a third multiplexor 34. Each of these two multiplexors receives an identical set of processor addresses. The second multiplexor passes the relevant address of one of the serviced requests to the second memory array 36. This array comprises 512 memory locations containing instructions I 4096 through I 6143. The data is retrieved and is then relayed along data bus 38 from the memory array to the processor initiating the request. In like manner, the third multiplexor 34 passes an address of the other serviced requests to the third memory array 40. As with the second array 36, the third array comprises 512 memory locations containing the identical instructions I 4096 through I 6143. This data in turn is retrieved and is transmitted along bus 42 to the processor that requested the information.

Requests for outbound data are handled in a manner similar to those for inbound data with a third arbiter 20 servicing incoming requests 18 on the basis of priority, controlling a fourth multiplexor 54, and fifth multiplexor 56. Each location address is routed to one of the identical memory arrays 58 and 60. Each array comprises 512 memory locations containing instructions I 6144 to I 8191. The outbound data from array 58 is returned via bus 62 to a requesting processor and data from the memory array 60 is returned by bus 64 to the processor initiating the request.

Reporting instructions are handled through fourth arbiter 76 and fifth arbiter 78. The fourth arbiter 76 receives and services multiple reporting task instructions 72 from the processors, and controls a sixth multiplexor 80 that in turn passes the address of the serviced request for reporting instructions to a sixth memory array 82. This memory array is shown with 512 memory locations each with 4 processor instructions. The first location contain instructions numbered I 8192 to I 8195. In like manner, the fifth arbiter 78 receives and services multiple reporting task instructions 74 from the processors, and controls a seventh multiplexor 84. This multiplexor passes the address of the serviced request for reporting instructions to the seventh memory array 86. This array likewise is shown with 512 memory locations, each containing 4 processor instructions. The first location contains instructions numbered I 8196 to I 8199. The next set of instruction is numbered I 8200 to I 8203 and is located in memory array 6. This interleaving of the instruction storage for one task in two separate memory arrays allows the system to process a first instruction set through the sixth array 82 and the next set of instructions through the seventh array 86. This interleaving allows task #4 to store twice as many instructions as those in tasks #2 and #3. One trade-off for the increased number of instructions can be more latency in the interleaved system because of a narrower bandwidth than with the tasks that utilize duplicate arrays. Each set of instructions is returned to the processor requesting the same through dedicated data bus 88 from the $6^{th}$ memory array 82 or data bus 90 from the $7^{th}$ memory array 86.

Thus, it can be seen from the foregoing discussion of FIG. 1 that the instruction memory system of this invention utilizes several techniques for increasing the efficiency of handling disjoint tasks. This can be done by reducing the amount of instruction storage by consolidating the identical code from each of the processors into a one or two copies shared by all processors. In addition, techniques are applied to increase the instruction bandwidth of the memory system to support the combined number of processors.

This instruction memory system combines the code from all the individual processors into a single memory subsystem. A number of techniques are applied to this memory subsystem to increase the instruction bandwidth to accommodate a group of processors. These techniques include the following:

1. Reading more than one instruction on each access to the memory array; for example, by organizing the memory array in such a way that four instructions are read on each access to the memory array.
2. Segmenting the instruction address space into regions each with a separate memory array and controlled by its own arbitration logic and address multiplexors. The code in each segment implements one of the disjoint tasks, for example, inbound traffic processing, outbound traffic processing or control traffic processing.
3. Duplicating the instructions in a second array for portions of the code with a higher degree of processor contention.
4. Arbitrating for the duplicated memory segment in a way that selects two contending processors on each access.
5. Interleaving of memory arrays with separate arbitration for each array.

Other features of this instruction memory subsystem include the following:
a) Additional interface to the instruction memory subsystem for the minimum amount of code that is loaded into the processors at initialization.
b) Interface through which a processor can write or read the contents of the instruction memory subsystem.
c) Arbitration and control logic that allows one of the instruction address code segments to be located in external DRAM.

The instruction memory system disclosed here has other added dimensions to the increase in memory bandwidth. First, the instruction address space is segmented and implemented with separate memory arrays and arbitration for various disjoint tasks. Second, the instruction address segments for certain disjoint tasks have two memory arrays with duplicate content. For these, an arbiter services requests from the processors, one arbiter for each pair of duplicate memory arrays. Third, each of the memory arrays includes a separate data and address path. These paths are not shared with the other arrays. Lastly, interleaved memory arrays are used for certain tasks requiring a large number of instruction memory locations. These interleaved arrays have separate arbitration, address path and data path for each array.

Segmentation of the instruction address space and implementation with separate memory arrays reduces contention for the instruction memory subsystem. Each of the disjoint tasks is confined to one of the segments. Processors executing one of the tasks, say inbound traffic processing, will be contending for the same segment of memory. These same processors will not be contending for the instruction address segment dedicated to outbound traffic processing. This means that instruction memory requests for inbound traffic processing and outbound traffic processing can be satisfied simultaneously. Since tasks are assigned to processors from the resource pool, there will always be some distribution of tasks among the processors. The more evenly distributed, the lower the worst case contention for the instruction memory subsystem.

Dual memory arrays with duplicate data and arbitration yielding two winners will offset contention caused by task distributions consisting of mainly a single task. The second array provides the additional instruction bandwidth during these peak periods. During other periods, the added instruction bandwidth of this scheme of dual arrays and dual arbitration provides lower latency in accessing instructions. Array interleaving will have the effect of distributing processors performing the same task across the interleaved arrays. Since the interleaved arrays operate independently, this technique will further reduce contention for the individual arrays and lower instruction fetch latency.

The present invention is described in terms of a seven memory array servicing a network of processors. It should be understood that the invention is likewise applicable to a greater or a smaller number of processors, and correspondingly more or fewer memory arrays. In like manner, the present invention is not limited to a system that has only four disjoint tasks of inbound, outbound reporting or control. Instead other tasks such as routing table maintenance, and physical layer device management can likewise be included. The instructions for these other tasks can be set up in a single array, a duplicate array, or interleaved, depending on the degree of processor contention, the required number of instruction storage locations, and the speed with which the instructions are to be delivered. The interleaving of the memory arrays can be utilized for 2 arrays as described or for multiples of 2 such as 4 arrays or 8 arrays.

Although the invention has been described in terms of the control task having a single memory array, it could likewise have a duplicate set of arrays as with the inbound or outbound tasks, or it could be provided with an interleaved arrays as with the reporting tasks. In similar manner, the inbound or outbound traffic instructions could be stored in a single array as with the control instructions, or could be provided with multiple arbiters and interleaved arrays as with the reporting instructions. Lastly, the reporting instructions could be set up in duplicative arrays rather than interleaved as described.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A computer instruction memory system for concurrently handling instructions for multiple system processors comprising:
a) a plurality of memory arrays operating as independent subsystems corresponding to a number of disjoint tasks to be performed;
b) a separate data path and data address for each memory array;
c) means for consolidating identical instruction codes for a given disjoint task into at least one memory array; and
d) means to share all of the instruction codes from the memory arrays with all of the processors in the system;
wherein said number of disjoint tasks include inbound tasks, outbound tasks, and control tasks, and wherein separate arbiters are adapted for receiving and serving separate requests of inbound task instructions, outbound task instructions, and control task instructions, respectively, and controlling multiplexors to pass the address of the instructions on the order of priority to a single memory array.

2. The computer instruction memory system according to claim 1 wherein one disjoint task includes inbound traffic, and the instruction code for said task is stored in duplicate memory arrays.

3. The computer instruction memory system according to claim 1 wherein one disjoint task includes outbound traffic and the instruction code for this task is stored in duplicate memory arrays.

4. The system according to claim 1 wherein the disjoint tasks include a code for control tasks, and the code is stored in a separate non-duplicative memory.

5. The system according to claim 4 wherein a first arbiter is adapted to receive and service all requests for control task instructions and to control a first multiplexor, and the multiplexor is adapted to pass the address of the instructions to a single memory array.

6. The system according to claim 5 wherein a second arbiter is adapted to receive and service all requests for inbound task instructions and to control a second multiplexor and a third multiplexor on the order of priority the second multiplexor is adapted to pass the address of the first serviced inbound task instructions to a second memory array and the third multiplexor is adapted to pass the address of the second serviced inbound task instructions to a third memory array.

7. The system according to claim 6 wherein a third arbiter is adapted to receive and service all requests for outbound task instructions and to control a fourth multiplexor and a fifth multiplexor on the order of priority, the fourth multiplexor is adapted to pass the address of the first serviced outbound task instructions to a fourth memory array and the fifth multiplexor is adapted to pass the address of the fourth serviced outbound task instructions to a fifth memory array.

8. The system of claim 7 further including an instruction address space divided into code segments corresponding to the disjoint tasks to be performed and said code segments are implemented with separate arrays and arbitration.

9. The system according to claim 8 further including at least one disjoint task including two interleaved instruction memory arrays.

10. The system according to claim 9 wherein a fourth arbiter and a fifth arbiter are adapted to receive and service all requests for disjoint task instructions stored in the interleaved arrays and to control a sixth multiplexor and a seventh multiplexor on the order of priority, the sixth multiplexor is adapted to pass the address of the serviced instructions from the fourth arbiter to a sixth memory array and the seventh multiplexor is adapted to pass the address of the serviced instructions from the fifth arbiter to a seventh memory array.

11. The system according to claim 9 wherein the disjoint task having the interleaved memory arrays is a reporting task.

12. A method for concurrently processing a plurality of disjoint tasks from a plurality of processors in a computer system including the steps of:
   a) providing a plurality of memory arrays operating as independent subsystems corresponding to a number of disjoint tasks to be performed;
   b) providing a separate data path and data address for each memory array;
   c) providing means for consolidating identical instruction codes for a given disjoint task into at let one memory array, and
   d) sharing all of the instruction codes from the memory arrays with all of the processors in the system,
   wherein said plurality of disjoint tasks include inbound tasks, outbound tasks, and control tasks, and wherein separate arbiters are adapted for receiving and serving separate requests of inbound task instructions, outbound task instructions, and control task instructions, respectively, and controlling multiplexors to pass the address of the instructions on the order of priority to a single memory array.

13. The method according to claim 12 wherein the disjoint tasks include control tasks which include the step of storing a control task code in a non-duplicative memory.

14. The method according to claim 13 wherein the disjoint tasks include inbound traffic and outbound traffic, involving the step of segmenting the code for each of these tasks and storing each segment in duplicate memory arrays.

15. The method according to claim 13 wherein a first arbiter receives and services all requests for control task instructions and controls a first multiplexor, and the first multiplexor sequentially passes the instructions to a single memory array.

16. The method according to claim 15 wherein a second arbiter receives all requests for inbound task instructions and controls a second and a third multiplexor, the second multiplexor sequentially passes inbound requests to a second memory array, and the third multiplexor passes inbound requests to a third memory array.

17. The method according to claim 16 wherein a third arbiter receives all requests for outbound task instructions and controls a fourth and a fifth multiplexor, the fourth multiplexor sequentially passes inbound requests to a fourth memory array, and the fifth multiplexor passes inbound requests to a fifth memory array.

18. The method according to claim 12 further including the step of performing at least one disjoint task using two interleaved instruction memory arrays.

19. The method according to claim 18 including the step of receiving and servicing all requests for disjoint task instructions stored in the interleaved arrays in a fourth arbiter and a fifth arbiter, the fourth arbiter controlling a sixth multiplexor and the fifth arbiter controlling a seventh multiplexor on the order of priority, the sixth multiplexor passing the address of the serviced instructions from the fourth arbiter to a sixth memory array, and the seventh multiplexor passing the address of the serviced instructions from the fifth arbiter to a seventh memory array.

20. The method according to claim 19 including the step of interleaving the instructions memory locations in the sixth memory array with the memory locations in the seventh memory array.

21. A computer instruction memory system having a wide memory bandwidth comprising.
   a) all space occupied by the instruction memory segmented into a plurality of code segments;
   b) each code segment assigned a disjoint task;
   c) a separate memory array and arbitration implementing each code segment,
   d) duplicate memory arrays for pre-selected segments having high processor contention, and
   e) separate data address and data paths for em memory array,
   wherein disjoint tasks include inbound tasks, outbound tasks, and control tasks, and wherein separate arbiters are adapted for receiving and serving separate requests of inbound task instructions, outbound task instructions, and control task instructions, respectively, and controlling multiplexors to pass the address of the instructions on the order of priority to a single memory array.

22. A method for increasing the memory bandwidth of a computer instruction memory system comprising the steps of
   a) segmenting the space occupied by the instruction address into code segments;
   b) implementing each code segment with separate memory arrays and arbitration;
   c) confining one disjoint task to one of the code segments;
   d) providing cain of the code segments with memory arrays having duplicate content, and e) providing a separate data address and data path for each memory wherein disjoint tasks include inbound tasks, outbound tasks, and control tasks, and wherein separate arbiters are adapted for receiving and serving separate requests of inbound task instructions, outbound task instructions, and control task instructions, respectively, and controlling multiplexors to pass the address of the instructions on the order of priority to a single memory array.

* * * * *